July 19, 1927.
H. P. TROENDLY
1,636,262
TORQUE CUSHIONING MEANS
Filed Aug. 6, 1925
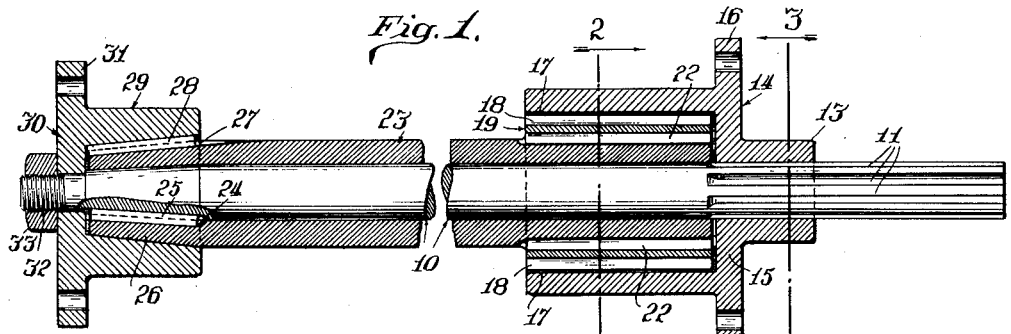
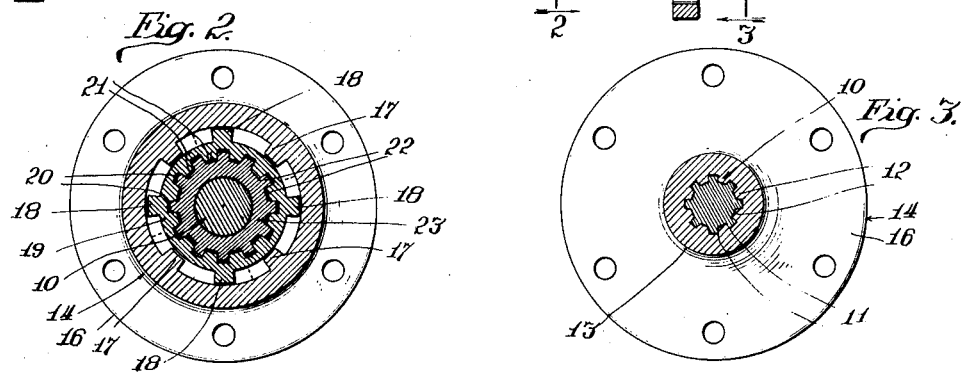
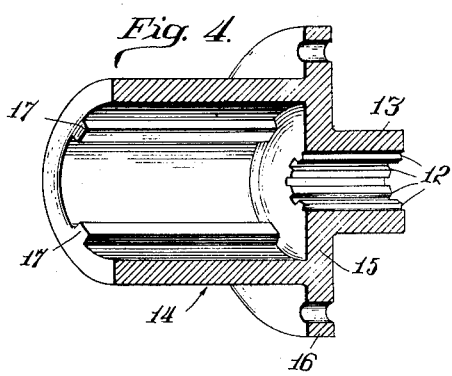
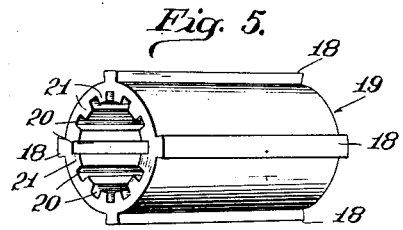
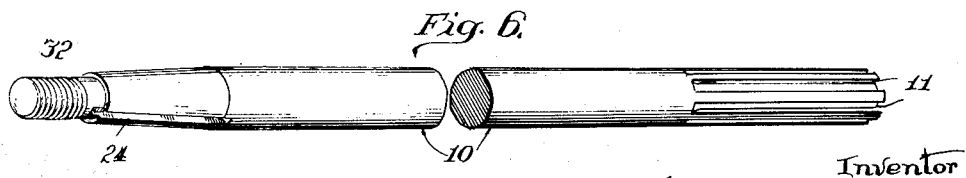
Witnesses
Inventor
Harry P. Troendly,
By George Heidner
Attorney Patented July 19, 1927.

1,636,262

UNITED STATES PATENT OFFICE.

HARRY P. TROENDLY, OF CHICAGO, ILLINOIS.

TORQUE-CUSHIONING MEANS.

Application filed August 6, 1925. Serial No. 48,451.

My invention relates to means for cushioning the torque in a power transmitting shaft; that is to say, the invention pertains to a shaft construction adapted for power transmission.

My invention is more especially adapted for use on motor driven vehicles, as for example, to constitute the driven shaft intermediate of the transmission mechanism and the differential mechanism of a motor driven vehicle.

My invention contemplates means whereby the power thrust or impulse applied to or received by a portion of the means is imparted to an element or portion which takes up the initial twist or torque before imparting the impulse to a third portion or outer element, which then absorbs the same; the elements being operatively connected by suitable coupling elements, all as will be more fully understood from the following detailed description of the drawing, wherein:—

Figure 1 is a longitudinal sectional view of my improved means.

Figure 2 is a cross sectional view taken substantially on the line 2—2 of Figure 1 looking in the direction of the arrows.

Figure 3 is a cross sectional view taken on the line 3—3 of Figure 1 looking in the direction of the arrows.

Figure 4 is a detail sectional view of one of the coupling elements.

Figure 5 is a detail perspective view of an inner coupling element.

Figure 6 is a longitudinal view, with an intermediate portion broken away, of the inner driving element or member.

My invention, as shown in the drawing, is more especially adaptable as the power transmitting shaft of a motor driven vehicle, namely as the shaft intermediate of the transmission mechanism and the differential mechanism of the vehicle and in the specific exemplification comprises an inner member or shaft 10, which may be either solid or hollow.

One end of this inner shaft 10 is longitudinally grooved or splined as at 11 to receive the longitudinally disposed ribs or teeth 12 formed on the inner perimeter of the hub portion 13 of an outer coupling member 14. The coupling member 14 is preferably in the form of a cylindrical shell open at one end and provided at the other end with an end wall 15 with which the hub portion or extension 13 is preferably formed integral. The end wall 15 of the member 14 is shown extending radially beyond the main or body portion of shell 14 to provide an attaching flange 16 which is shown apertured to receive suitable bolts for securing it to the power imparting member or to a universal joint in the driving shaft of the vehicle.

The inner circumference of the cylindrical or tubular member 14 is provided, at suitable spaced intervals, with the inwardly and radially disposed longitudinal ribs or teeth 17, see Figure 4, which are adapted to normally extend or be disposed intermediate of the longitudinally formed radial ribs 18 of an inner coupling member 19 which is also preferably of cylindrical or tubular formation as shown in Figure 5.

The inner circumference of the inner coupling member 19 is shown provided with a series of equally spaced slots or grooves 20, thus providing the intermediate longitudinal toothed portions 21, which are adapted to extend into longitudinally formed grooves 22, formed in an outer member or hollow shaft 23. The end of the outer member or hollow shaft 23 is provided with grooves of length substantially equal to the length of the tubular inner coupling member 18, and movement of member 18 toward the opposite end of shaft 23, namely to the left beyond the position shown in Figure 1 prevented; while movement of shaft 23 and coupling member 18 to the right beyond the position shown in Figure 1 will be prevented by the end wall 15 of the outer coupling member 14.

On the other hand, it is apparent that with outer coupling member 14 fixedly secured against longitudinal movement, relative movement, in a longitudinal direction, between inner coupling member 18, outer shaft 23 and inner shaft 10 may, however, take place, to compensate for any shortening of the two shafts by reason of the twist or torque, while operative relation between the parts, however, may be maintained.

The opposite end of the inner shaft 10 is preferably shown slightly tapered and provided with a slot or key-way 24 (see Figure 6) to receive a suitable key 25 which also fits into a slot or key-way formed on the interior of the end of outer shaft 23, which in this instance is likewise made tapering or reduced as shown at 26 in Figure 1.

The outer surface of outer shaft 23 at the end just described is also shown provided with a slot or key-way 27 to receive a key 28 which also fits into a slot or key-way formed on the inner circumference of a coupling member 29. Coupling member 29 is preferably in the nature of a short sleeve with the outer end having an end wall 30 which is preferably extended beyond the outer circumference to provide an attaching flange 31, which may be apertured as shown to enable the coupling member 29 to be secured to another universal joint or to a suitable element on the shaft to be driven or other member to which the power is to be transmitted.

With the inner shaft, whether solid or hollow, made more or less flexible, it is apparent from the construction shown and described that the initial impulse received will be taken up by the torque of this inner shaft before it is transmitted to the outer shaft; that is to say, the initial torque is taken up by the inner tube, while the maximum or major load will be transmitted to and carried by the outer shaft.

Assuming that the member 14 receives the power impulse and constitutes the driving member, the impulse is transmitted to the inner shaft 10 through the splined relation between the end 11 of the shaft and the hub 13 of the coupling member 14 and the initial thrust or impulse taken up or absorbed by and during the twist of shaft 10. If the torque, and consequently the twist of the shaft 10, exceeds a predetermined degree, it is evident that the ribs or teeth 17 of outer coupling member 14 will be brought into contact with the longitudinal ribs or teeth 18 of inner coupling member 19, which in turn impart any additional or increased thrust or impulse to the outer shaft 23 which may be less flexible than the inner shaft 10.

With the opposite ends of the two shafts non-yieldingly connected together, by means of the keys or by any other non-yielding relation between the shafts, the load or power-impulse is then imparted to the driven member or coupling 29. The elongated splined relation between shaft 10 and member 14 and between coupling 14 and coupling 19 and between coupling 19 and outer shaft 23 will permit relative longitudinal movement of the parts to compensate for the torque of the shafts; the construction constituting torque cushioning means which will absorb the impulses and sudden changes in either the power or the load and thus absorb and prevent transmission of shocks to the driven element or driving axles of the automobile.

In the construction shown, the key 25 is driven into place before the coupling member 29 is applied; while key 28 is driven into place after the member 29 is placed on the ends of the concentric shafts; the coupling member 29 being held in place and movement between the inner shaft 10 and member 29 in a longitudinal direction prevented by providing the reduced threaded end 32 of shaft 10 with a nut as at 33 in Figure 1, thereby maintaining the assembled relation between the various parts; it being evident, however, that a non-rotative relation between the ends of shafts and member 29 may be differently provided.

For the purposes of exemplification, I have shown the inner shaft 10 splined at one end, although it is apparent that the order may be reversed; it being also understood that the inter-connection or inter-operation between the solid shaft and the outer shaft may be accomplished in a different manner from that shown and described, a suitable connection being required whereby the initial load is assumed by the more flexible shaft until the interconnecting means provides a rigid connection between the two shafts, as a result of a greater load, thereby transmitting the stress or load to the more rigid shaft. Furthermore, it will be understood that the ends of the inner shaft may be squared to affect operative relation with a connecting member or other ways employed from that shown and described; and other detail forms of keying or securing the outer shaft to member 29; the construction shown being thought to be a simple embodiment of my invention, which has been described in terms employed merely as terms of description and not as terms of limitation, as structural modifications may be made without, however, departing from the spirit of my invention.

What I claim is:—

1. Torque cushioning means, comprising a pair of shafts, one within the other, one end of the inner shaft being longitudinally grooved, a coupling member having splined relation with the grooved end of the inner shaft, a second member splined on the adjacent end of the outer shaft, means whereby operative relation between the two members is provided when the twist of the inner shaft reaches a predetermined degree and the torsional impulse is then transmitted to the outer shaft, and means whereby the opposite ends of the two shafts are operatively connected together.

2. Torque cushioning means, comprising an inner flexible shaft, an outer shaft, a coupling member splined on one end of the inner shaft, an intermediate member splined on the adjacent end of the outer shaft, and means intermediate of the two members whereby positive driving relation between the members and shafts is provided when the twist of the inner shaft reaches a predetermined degree.

3. Torque cushioning means, comprising a pair of concentric shafts of unequal resiliency, a driving member having splined relation with the extended end of the inner shaft so as to permit relative longitudinal movement therebetween, a second member located within the driving member and having splined relation with the adjacent end of the outer shaft to permit relative longitudinal movement between said second member and the outer shaft, and radially disposed ribs on the inner perimeter of the driving member and on the outer perimeter of the second member, normally in spaced relation with each other, whereby relative longitudinal movement between the two members is permitted and a positive driving relation between said members and the two shafts provided when the torque of the inner shaft reaches a predetermined degree.

4. Torque cushioning means, comprising a hollow shaft splined at one end, a second shaft located within the hollow shaft with its ends extending therebeyond and one of said ends splined, a coupling member provided with a reduced portion or hub having operative relation with the splined end of said second shaft while the main portion of said member receives the end of the hollow shaft, a second member concentric with the coupling member and having splined relation with the hollow shaft, with the opposing surfaces of the two members so formed as to provide positive driving relation between the shafts after the twist of the second mentioned shaft reaches a predetermined degree, and coupling means at the other ends of both shafts whereby the two shafts are rigidly coupled together.

5. A torque cushioning means comprising a pair of shafts arranged one within the other with the inner shaft extending throughout the length of the outer shaft, means whereby the shafts at one end are rigidly connected together, means slidably mounted on and operatively connected to the other end of one of said shafts, and means intermediate of said last mentioned means and the adjacent end of the second shaft whereby the shafts are operatively connected together so as to permit the torque of the one shaft to absorb the initial impulse and provide a positive relation between both shafts when the twist of the first mentioned shaft reaches a predetermined degree.

HARRY P. TROENDLY.